E. BUGATTI.
SPRING SUSPENSION FOR VEHICLES.
APPLICATION FILED APR. 20, 1914.
1,117,971.
Patented Nov. 24, 1914.
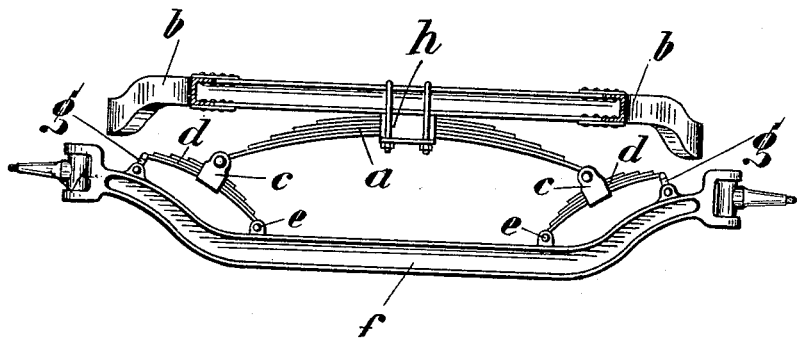
Witnesses:—
D. F. Schilling
Hermann Henry
Inventor:—
Ettore Bugatti
by
his attorney

UNITED STATES PATENT OFFICE.

ETTORE BUGATTI, OF MOLSHEIM, GERMANY.

SPRING SUSPENSION FOR VEHICLES.

1,117,971.      Specification of Letters Patent.      Patented Nov. 24, 1914.

Application filed April 20, 1914. Serial No. 833,175.

*To all whom it may concern:*

Be it known that I, ETTORE BUGATTI, a subject of the King of Italy, and residing at Molsheim, Alsace, Germany, have invented certain new and useful Improvements in Spring Suspension for Vehicles, of which the following is a specification.

The present invention has reference to improvements in spring suspension mechanism for vehicles, and relates more particularly to a novel manner of supporting the car body upon the underframe or wheel axles by means of sets of peculiarly interconnected springs, and the object of the invention is to obtain a safe, simple and effective spring suspension for the car body, conducive to comfortable riding even on imperfect roads, with relatively little up and down play and also a certain limited lateral play of the car body.

In order to make this invention more readily understood, I will describe it with reference to the accompanying drawing, which shows a front elevation of a preferred embodiment of my invention.

According to this invention the device essentially consists of three spring members, each such member comprising a plurality of nested leaf springs of well known type. The main semi-elliptical transverse spring *a* is rigidly secured at its middle portion to the vehicle frame or body *b*, for instance by means of the stirrup seat *h*, and the smaller laminated springs *d*, also of semi-elliptical shape, are pivotally secured by means of the hinge clamps *c* to the respective eye-ends of the main spring *a*. The inner ends of the small springs are pivoted to the underframe or axle *f* at *e*, and their outer ends are connected thereto by means of the links or shackles *g*. The smaller springs *d* are preferably positioned angularly to the horizontal plane and at opposite angles thereto, facing away from each other. Such a spring device has the tendency to always retain the position shown in the drawing, with the car body in horizontal position. Upon the car being subjected to road shocks the springs can distend or "give" to a limited, yet greater, extent, owing to the provision of the shackles, than if the large spring *a* alone were interposed between the car body and the wheel axle, and the lateral displacements, *i. e.* the sidewise lunges of the car body are greatly reduced.

What I claim is:—

1. In a spring suspension device for vehicles, the combination with the car body and a car axle, of a set of leaf springs for supporting the car body from the car axle, comprising a main bearing spring, suitably secured to the car body, and two smaller leaf springs, each respectively pivoted at its intermediate portion to one of the ends of said main spring, the inner end of each such smaller spring pivoted to the axle, and a link or shackle interposed between the axle and the outer end of each smaller spring.

2. In a spring suspension device for vehicles, in combination, the car body, a car axle, a transverse semi-elliptical laminated spring, means intermediate the ends of this spring for rigidly securing it to the car body, a smaller semi-elliptical spring pivotally secured to either end of the said transverse spring, means for pivotally securing the inner ends of said smaller springs to the axle, and shackle means for securing the outer ends of said smaller springs to the axle.

3. In a spring suspension device for vehicles, in combination, the car body, a car axle, a transverse semi-elliptical laminated spring, means for rigidly securing this spring to the car body, two smaller semi-elliptical springs, each pivotally secured to one end of the first said transverse spring, means for pivotally securing the inner ends of said smaller springs to the axle of underframe, and means for securing the outer ends of said smaller springs to the axle or underframe with limited distension, the said smaller springs being positioned at an angle to the horizontal plane and facing in opposite directions.

In testimony whereof I affix my signature in presence of two witnesses.

ETTORE BUGATTI.

Witnesses:
    JOSEPH ROHMER,
    CHARLES A. HALLEY, Jr.